United States Patent
Bai et al.

(10) Patent No.: US 8,818,359 B2
(45) Date of Patent: Aug. 26, 2014

(54) METHOD AND APPARATUS FOR USING A RADIO ACCESS TECHNOLOGY IN A MOBILE STATION EMPLOYING A REMOVABLE MEMORY DEVICE

(75) Inventors: Xiaofeng Bai, Grayslake, IL (US); Donald A. Dorsey, Vernon Hills, IL (US); Sharada Raghuram, Buffalo Grove, IL (US)

(73) Assignee: Motorola Mobility LLC, Libertyville, IL (US)

( * ) Notice: Subject to any disclaimer, the term of this patent is extended or adjusted under 35 U.S.C. 154(b) by 120 days.

(21) Appl. No.: 13/410,489

(22) Filed: Mar. 2, 2012

(65) Prior Publication Data

US 2013/0231105 A1    Sep. 5, 2013

(51) Int. Cl.
*H04W 24/00* (2009.01)

(52) U.S. Cl.
USPC ............ 455/426.1; 455/435.3; 455/434; 455/552.1; 455/558; 455/422.1

(58) Field of Classification Search
USPC ............ 455/426.1, 422.1, 552.1, 432.1, 433, 455/558; 370/328–338
See application file for complete search history.

(56) References Cited

U.S. PATENT DOCUMENTS

| | | | |
|---|---|---|---|
| 2009/0247160 A1* | 10/2009 | Muller | 455/435.3 |
| 2010/0015978 A1 | 1/2010 | Yoon et al. | |
| 2011/0014913 A1* | 1/2011 | Yoon et al. | 455/435.3 |
| 2011/0211567 A1 | 9/2011 | Chai et al. | |
| 2013/0109377 A1* | 5/2013 | Al-Khudairi et al. | 455/432.1 |

FOREIGN PATENT DOCUMENTS

| | | |
|---|---|---|
| EP | 1921882 A1 | 5/2008 |
| GB | 2490989 A | 11/2012 |

OTHER PUBLICATIONS

Qualcomm Europe: "RAT selection when HPLMN selector with access technology data file is missing in the SIM or PLMN selector data file is used". 3GPP Draft; CI-092456-121-CI-092124-23122-860-RAT-PRIO RITY-V01. 3rd Generation Partnership Project (3GPP). Mobile Competence Centre; 650. Route Des Lucioles ; F-06921 Sophia-Antipolis Cedex ; France. no. Sevilla; 20090803. Aug. 3, 2009.

Patent Cooperation Treaty, International Search Report and Written Opinion of the International Searching Authority for International Application No. PCT/US2013/028511, Apr. 24, 2013, 17 pages.

(Continued)

*Primary Examiner* — Chuong A Ngo
(74) *Attorney, Agent, or Firm* — Morris & Kamlay LLP

(57) ABSTRACT

A mobile station (MS) is provided that includes one or more memory devices that maintain a RAT preference rule and that include a removable memory device (RMD) that maintains a data file that includes a prioritized listing of one or more PLMN/RAT combinations. The MS detects a RAT and a PLMN broadcasting on that RAT and determines a type of the RMD. When the RMD is a type that would maintain information on the detected RAT, the MS determines a priority of the detected PLMN/RAT combination relative to other PLMN/RAT combinations based solely on the prioritizations included in the data file. When the RMD is a type that would not maintain information on the detected RAT, the MS determines a priority of the detected PLMN and RAT relative to other PLMN/RAT combinations based on the RAT preference rule in conjunction with the listing of PLMN/RAT combinations in the data file.

20 Claims, 2 Drawing Sheets

(56) References Cited

OTHER PUBLICATIONS

ETSI TS 131.102 v9.2.0 (Apr. 2010) Technical Specification, Universal Mobile Telecommunications System (UMTS); LTE; Characteristics of the Universal Subscriber Identity Module (USIM) application (3GPP TS 31.102 version 9.2.0 Release 9), 214 pages.

ETSI TS 123.122 v9.4.0 (Oct. 2010) Technical Specification, Digital cellular telecommunications system (Phase 2+); Universal Mobile Telecommunications System (UMTS); Non-Access-Stratum (NAS) functions related to Mobile Station (MS) in idle mode (3GPP TS 23.122 version 9.4.0 Release 9), 44 pages.

* cited by examiner

METHOD AND APPARATUS FOR USING A RADIO ACCESS TECHNOLOGY IN A MOBILE STATION EMPLOYING A REMOVABLE MEMORY DEVICE

FIELD OF THE INVENTION

The present invention relates generally to mobile stations, and in particular to selecting a radio access technology by a mobile station that employs a removable memory device, for example, a Subscriber Identity Module (SIM) card.

BACKGROUND OF THE INVENTION

When selecting a network for wireless service, a cell phone that supports multiple radio access technologies (RATs) needs to select both a public land mobile network (PLMN) and a radio access technology (RAT) while performing a search for a serving cell. To facilitate such a PLMN/RAT selection, a universal Subscriber Identity Module (USIM) card of the cell phone may include three data files, that is, (1) a Home PLMN (HPLMN) Selector with Access Technology (EF-HPLMNwAcT) data file, (2) a User Controlled PLMN Selector with Access Technology (EF-PLMNwAcT) data file, and (3) an Operator Controlled PLMN Selector with Access Technology (EF-OPLMNwAcT) data file. Pursuant to Technical Specification (TS) 31.102 of the 3GPP (Third Generation Partnership Project) standards, each entry in these data files defines a PLMN/RAT(s) combination where multiple RATs specified in a single entry indicate that those RATs are equally preferred access technologies for the listed PLMN. The EF-PLMNwAcT and EF-OPLMNwAcT data files provide the preferred roaming partners and access technologies when the subscriber is outside of HPLMN coverage.

According to TS 23.122 of the 3GPP standards, the PLMN/RAT entries in the EF-PLMNwAcT and EF-OPLMNwAcT data files shall be considered for selection in priority order. For example, if PLMN 'A' and PLMN 'B' both are roaming partners of a subscriber's HPLMN, but PLMN A and an associated RAT 'X' (PLMN-A/RAT-X) is listed before PLMN B and an associated RAT 'Y' (PLMN-B/RAT-Y) in the EF-PLMNwAcT or EF-OPLMNwAcT data files maintained in the USIM card of the subscriber's cell phone, then PLMN-A/RAT-X will be selected when it is detected, even if PLMN-B/RAT-Y is also present. It may be noted that the EF-HPLMNwAcT data file, however, only defines the RAT preference for the subscriber's HPLMN and all equivalent HPLMNs and the PLMN code of each entry in EF-HPLMNwAcT data file is not used, as per TS 23.122.

As a result, if an old Subscriber Identity Module (SIM) card is used in a multi-mode cell phone that supports a new RAT not listed in the old SIM card, then that new RAT may never be utilized in certain scenarios because the new RAT has never been programmed in any preferred list file entry of the old SIM card. For example, if a subscriber uses the SIM card from his or her old UMTS (Universal Mobile Telecommunications System) cell phone in a new E-UTRA (Evolved UMTS Terrestrial Radio Access) capable multi-mode cell phone, and the subscriber is located outside of the HPLMN's coverage area and in an area where the most preferred roaming partner network only provides E-UTRA coverage, then the new multi-mode cell phone may never be able to camp on that roaming partner's E-UTRA network. Specifically, if PLMN-A/UTRA is listed before PLMN-B/UTRA in the EF-PLMNwAcT data file or the EF-OPLMNwAcT data file of the old SIM card, and the subscriber is within an area where only PLMN-A/E-UTRA and PLMN-B/UTRA are present, then the new multi-mode cell phone will stay on PLMN-B/UTRA even though PLMN-A is a more preferable roaming partner and even though the new multi-mode cell phone does support E-UTRA access technology.

This problem cannot be resolved by performing periodic HPPLMN (Higher Priority PLMN) scans to find higher priority PLMNs because, based on the existing USIM preferred list information, PLMN-A/E-UTRA is not a higher priority PLMN/RAT combination than PLMN-B/UTRA. Also, this problem cannot be resolved by performing Inter-RAT reselections within PLMN B because even if the new multi-mode cell phone could reselect to PLMN-B/E-UTRA, the multi-mode cell phone still will not go to PLMN-A/E-UTRA.

Figure 1:
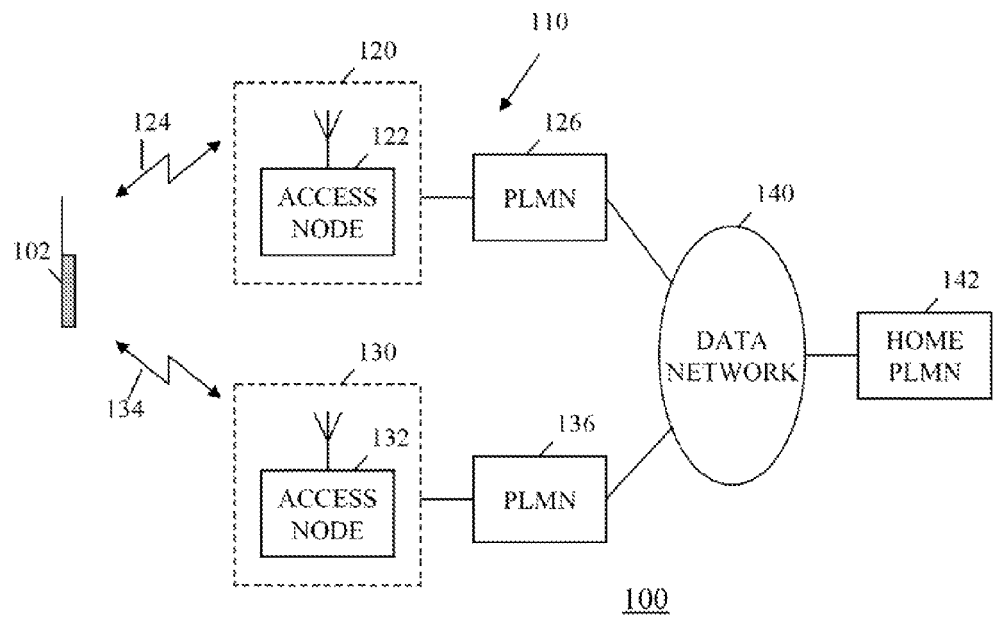
FIG. 1 is a block diagram of a wireless communication system in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DESCRIPTION OF A PREFERRED EMBODIMENT

To address the need for a method and apparatus in a cellular telephone for selecting a RAT when a detected RAT is not included in any entry of the User Controlled PLMN Selector with Access Technology (EF-PLMNwAcT) data file and the Operator Controlled PLMN Selector with Access Technology (EF-OPLMNwAcT) data file, a method and a mobile station (MS) are provided for selecting a radio access technology (RAT) for wireless service. The MS includes one or more memory devices that maintain a radio access technology (RAT) preference rule and that include a removable memory device that is configured to maintain a data file that includes a prioritized listing of one or more PLMN/RAT combinations. The MS wirelessly detects a RAT and a PLMN broadcasting on that RAT to produce a detected PLMN/RAT combination and determines a type of the removable memory device. In response to determining that the removable memory device is a type that would maintain information on the detected RAT, the MS determines a priority of the detected PLMN/RAT combination relative to one or more other PLMN/RAT combinations based solely on the prioritizations included in the data file in the removable memory device. In response to determining that the removable memory device is a type that would not maintain information on the detected RAT, the MS determines a priority of the detected PLMN and RAT relative to one or more other PLMN/RAT combinations based on the RAT preference rule in conjunction with the listing of PLMN/RAT combinations in the data file in the removable memory device and selects a PLMN and RAT for radio communications based on the determined priority of all found PLMN/RAT combinations.

Generally, the present invention encompasses a method, in a mobile station, for selecting a public land mobile network (PLMN) and radio access technology (RAT). The method includes maintaining, in a removable memory device, a data file comprising a prioritized listing of one or more public land mobile networks (PLMNs) in combination with one or more radio access technologies (RATs), wirelessly detecting a RAT and a PLMN broadcasting on that RAT to produce a detected PLMN/RAT combination, and determining a type of the removable memory device. The method further comprises, in response to determining that the removable memory device is a type that would maintain information on the detected RAT, determining a priority of the detected PLMN/RAT combination relative to one or more other PLMN/RAT combinations based solely on the prioritizations included in the data file in the removable memory device, and in response to determining that the removable memory device is a type that would not maintain information on the detected RAT, determining a priority of the detected PLMN and RAT relative to one or more other PLMN/RAT combinations based on a RAT preference rule separate from, and in conjunction with, the listing of PLMN/RAT combinations in the data file in the removable memory device. The method additionally comprises selecting a PLMN and RAT for radio communications based on the determined priority of all the found PLMNs and RATs.

Another embodiment of the present invention provides a mobile station comprising a transceiver that is configured to wirelessly detect a RAT and a PLMN broadcasting on that RAT to produce a detected PLMN/RAT combination and one or more memory devices, wherein the one or more memory devices comprise a removable memory device that is configured to maintain a data file that includes a prioritized listing of one or more radio access technologies (RATs) and wherein the one or more memory devices further maintain a radio access technology (RAT) preference rule. The mobile station further comprises a processor that is configured to determine a type of the removable memory device, in response to determining that the removable memory device is a type that would maintain information on the detected RAT, determine a priority of the detected PLMN/RAT combination relative to one or more other PLMN/RAT combinations based solely on the prioritizations included in the data file in the removable memory device, in response to determining that the removable memory device is a type that would not maintain information on the detected RAT, determine a priority of the detected PLMN and RAT relative to one or more other PLMN/RAT combinations based on a RAT preference rule separate from, and in conjunction with, the listing of PLMN/RAT combinations in the data file in the removable memory device, and select a PLMN and RAT for radio communications based on the determined priority of all the found PLMNs and RATs.

The present invention may be more fully described with reference to FIGS. 1-3. FIG. 1 is a block diagram of a wireless communication system 100 in accordance with an embodiment of the present invention. Communication system 100 includes an infrastructure 110 comprising multiple radio access networks (RANs) 120, 130 (two shown), each radio access network (RAN) 120, 130 comprising a respective wireless access node 122, 132, such as but not limited to a base station, an access point, or a Node B. A first RAN 120 of the multiple RANs 120, 130 and a corresponding first access node 122 of the multiple access nodes 122, 132 supports a first radio access technology (RAT), that is, $RAT_1$. A second RAN 130 of the multiple RANs 120, 130 and a corresponding second access node 132 of the multiple access nodes 122, 132 supports a second, different RAT, that is, $RAT_2$, for example, a later generation version of the $RAT_1$. Each of access nodes 122, 132 is capable of providing wireless communication services to mobile stations residing in a coverage area of the access node via a respective air interface 124, 134 associated with the corresponding RAT.

Communication system 100 further includes a multimode mobile station 102 capable of communicating with each of RAN 120 and RAN 130 via their corresponding RATs, that is, $RAT_1$ and $RAT_2$. Mobile station (MS) 102 may be any portable wireless communication device known in the art, such as but not limited to a cellular telephone, a radio telephone, a smartphone, or a personal digital assistant (PDA), a laptop computer, or a tablet computer that is capable of radio frequency (RF) communications, and also may be referred to in various technologies as a user equipment (UE), an access terminal (AT), a subscriber station (SS), a remote unit (RU), and so on.

Each of RAN 120 and RAN 130 is in communication with a corresponding public land mobile network (PLMN) 126, 136, that is, the first RAN 120 is in communication with the first PLMN 126 of multiple public land mobile networks (PLMNs) 126, 136, 142 (three shown) and the second RAN 130 is in communication with the second PLMN 136 of the multiple PLMNs 126, 136, 142. In addition, MS 102 has a home PLMN (HPLMN) 142 that is associated with the MS's home network and further that is in communication with each of PLMN 126 and PLMN 136 via an intervening data network 140, such as but not limited to the Internet or a conventional switched telephone network. In various embodiments of the present invention, one or more of PLMNs 126, 136, and 142 may be the same PLMN. It is assumed herein that HPLMN 142 has a roaming agreement with each of PLMNs 126 and 136, that is, that each of PLMNs 126 and 136 is a roaming partner of HPLMN 142, such that MS 102 can obtain service from PLMNs 126 and 136 and can obtain wireless service from each of RANs 120 and 130.

Figure 2:
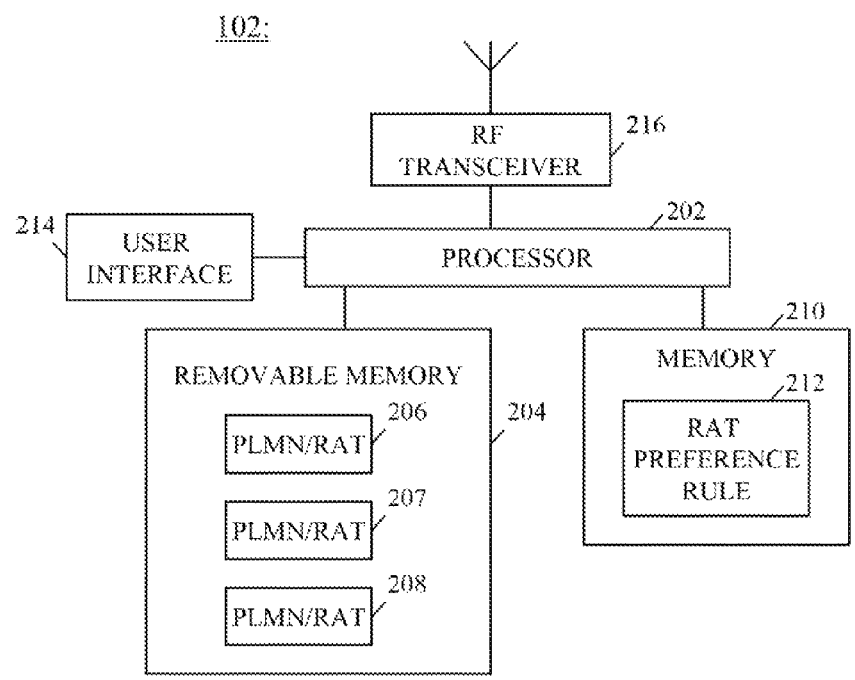
FIG. 2 is a block diagram of the mobile station of FIG. 1 in accordance with an embodiment of the present invention.

Referring now to FIG. 2, a block diagram is provided of MS 102 in accordance with an embodiment of the present invention. MS 102 includes a processor 202, such as one or more microprocessors, microcontrollers, digital signal processors (DSPs), combinations thereof or such other devices known to those having ordinary skill in the art, which processor is configured to execute the functions described herein as being executed by mobile station 102. The particular operations/functions of processor 202, and thus of MS 102, is determined by an execution of software instructions and routines that are stored in a one or more memory devices 204, 210 (two shown) associated with the processor, such as random access memory (RAM), dynamic random access memory (DRAM), and/or read only memory (ROM) or equivalents thereof, that store data and programs that may be executed by the corresponding processor.

One or more memory devices 204, 210 includes a removable memory device 204, such as an older type of removable memory device such as a Subscriber Identity Module (SIM) card or a newer type of removable memory device such as a universal SIM (USIM) card, and may further include a non-removable memory device 210, that is, a memory device that it not meant to be removed. MS 102 further includes a user interface 214 that is coupled to processor 202 and that permits a user to input instructions and information into, and receive information from, the MS. In various embodiments of the present invention, user interface 214 may include one or more of a display screen, which may comprise a touch screen, a keypad, audio input and output devices, visual alerts, and other components as are known in the art. Unless otherwise specified herein, the functions described herein as being performed by MS 102 are performed by processor 202 based on instructions maintained in one or more of one or more memory devices 204, 210.

MS 102 is a multi-mode MS that subscribes to the services of, and is capable of communicating with, each of RANs 120 and 130 and correspondingly supports each of $RAT_1$, associated with RAN 120, and $RAT_2$, associated with RAN 130. Accordingly, removable memory device 204 includes one or more PLMN/RAT data files 206-208 (three shown) that each comprises a prioritized list of one or more PLMNs and, in association with each listed PLMN (a PLMN may be listed more than once), a preferred RAT or RATs for that PLMN entry (which entry also is referred to herein as a PLMN/RAT(s) combination). The entries in these lists may be prioritized based on preferences by a user of MS 102 or may be prioritized by the HPLMN operator (i.e. the operator of Home PLMN 142), for example, based on network operating costs (for example, utilizing RAN 120 may be less expensive than utilizing RAN 130) and/or preferred network loading, or based on roaming agreements if one or more of the multiple RANs 120, 130 is operated by a system operator other than an operator of the user's home network.

For example, a first PLMN/RAT data file 206 of the one or more PLMN/RAT data files 206-208 may be a home network-based PLMN/RAT data file, such as a Home PLMN (HPLMN) Selector with Access Technology (EF-HPLMNwAcT) data file, a second PLMN/RAT data file 207 of the one or more PLMN/RAT data files 206-208 may be a user-controlled PLMN/RAT data file, such as a User Controlled PLMN Selector with Access Technology (EF-PLMNwAcT) data file, and a third PLMN/RAT data file 208 of the one or more PLMN/RAT data files 206-208 may be an operator-controlled PLMN/RAT data file, such as an Operator Controlled PLMN Selector with Access Technology (EF-OPLMNwAcT) data file, wherein each entry in the PLMN/RAT data files defines a PLMN/RAT(s) combination and where multiple RATs specified in a single entry, or PLMN/RAT(s) combination, indicates that those RATs are equally preferred access technologies for the PLMN listed therein. The first, home-based PLMN/RAT data file 206 lists preferred RATs, that is, lists acceptable RATs in a prioritized order, for when the MS is within coverage of the MS's home PLMN, that is, HPLMN 142. The second and third PLMN/RAT data files 207, 208 list preferred roaming partners and access technologies, that is, list acceptable PLMN/RAT combinations in a prioritized order, for use when the MS is outside of HPLMN coverage, for example, when the MS is outside of coverage of HPLMN 142 and within coverage of PLMNs 126 and/or 136. For example, if PLMN 136 and $RAT_2$ are preferred to PLMN 126 and $RAT_1$, then one or more of PLMN/RAT data files 207, 208 may prioritize the PLMN/RAT combination PLMN 136/$RAT_2$ over the combination PLMN 126/$RAT_1$, for example, list PLMN 136/$RAT_2$ earlier in the list than PLMN 126/$RAT_1$. The order of significance of PLMN/RAT data files 207, 208 is programmable by the Home PLMN operator.

MS 102 further maintains, in one or more of memory devices 204 and 210, a RAT preference rule 212. RAT preference rule 212 contains instructions for how to prioritize a "new" RAT relative to other existing RATs, that is, a "new" RAT being a RAT which is not included in any entry of any of the PLMN/RAT data files 206-208, due to, for example, the obsoleteness of these data files, such as due to removable memory device 204 being an "old" memory device. RAT preference rule 212 may be used by the MS to select a RAT when the MS detects a PLMN with associated RAT(s), where at least one of the detected RAT(s) is not listed in any entry of any of PLMN/RAT data files 206-208. In various embodiments of the present invention, RAT preference rule 212 may be a table that may be read by processor 202, an algorithm executed by the processor, or any other prioritization scheme that may occur to one of ordinary skill in the art.

MS 102 further includes at least one RF transceiver 216 that is coupled to processor 204 and that wirelessly interfaces with each of networks 120 and 130. For example, in one such embodiment, MS 102 may include multiple RF transceivers, that is, a first transceiver for operation in network 120 and a second transceiver for operation in network 130, thereby allowing the MS to concurrently transmit or receive in each of the two networks. In another embodiment of the present invention, MS 102 may include a single RF transceiver and can communicate with only a single network at a time.

Preferably, communication system 100 is a 3GPP (Third Generation Partnership Project) communication system, wherein access network 120 supports one generation of 3GPP radio access technology and access network 130 supports a later generation of 3GPP radio access technology. For example, access network 120 may be a UMTS (Universal Mobile Telecommunications System) and access network 130 may be a 3GPP LTE (Long Term Evolution) access network, respectively. However, one of ordinary skill in the art realizes that the principles described herein may apply to any pairing of wireless communication technologies, such as communication systems operating pursuant to any of the CDMA (Code Division Multiple Access), WCDMA (Wideband CDMA), GSM (Global System for Mobile communications), or High-Speed Packet Access (HSPA) standards, the 3GPP LTE-A (Advanced) standards, the 3GPP2 (Third Generation Partnership Project 2) Evolution standards, for example, the CDMA (Code Division Multiple Access) 2000 1X or 1XEV-DO standards, Wireless Local Area Network (WLAN) broadband standards, as described by the IEEE (Institute of Electrical and Electronics Engineers) 802.xx standards, for example, the 802.11, 802.16, or 802.21 standards, or any of multiple proposed ultrawideband (UWB) communication technologies and standards.

In the prior art, when a MS includes an old removable memory device, such as a SIM card from a different, older MS, that fails to list a new RAT supported by the MS, then that new RAT may never be utilized in certain scenarios because the new RAT has never been programmed in any PLMN/RAT file entry of the old SIM card. For example, suppose the MS is a new E-UTRA capable multi-mode cell phone, a user of the MS uses a SIM card from his or her old UMTS cell phone, and the MS is located outside of the coverage area of the MS's HPLMN and in an area where the most preferred roaming partner network only provides E-UTRA coverage. In such an instance, the MS may never be able to camp on that roaming partner's E-UTRA network. For example, suppose a first PLMN (PLMN A) and a second PLMN (PLMN B) are each roaming partners of the user's HPLMN, but a combination of PLMN A and UTRA (PLMN-A/UTRA) is listed before a combination of PLMN B and UTRA (PLMN-B/UTRA) in a EF-PLMNwAcT data file or a EF-OPLMNwAcT data file of the old SIM card. Further, suppose the MS is within an area where only PLMN-A/E-UTRA and PLMN-B/UTRA are present. In such an instance, the MS will stay on PLMN-B/UTRA even though PLMN A may be a more preferable roaming partner and even though the MS does support E-UTRA access technology.

In order to resolve this problem, MS 102 includes a RAT preference rule 212 common for all roaming partners of an HPLMN, such as PLMNs 126 and 136 with respect to HPLMN 142, that will be applied when an old removable memory device is detected by an MS, such as MS 102, to determine a priority level of a new RAT, for example, an E-UTRAN (Evolved UMTS Terrestrial Radio Access Network) RAT, relative to other existing RATs on the old removable memory device. One may note, however, that MS 102 may nevertheless fully rely on an existing removable memory device (for example, a USIM card) PLMN/RAT data file verbatim to determine the priority level of all supported RATs including the new (for example, E-UTRAN) RAT, when the removable memory device is up-to-date or once the old removable memory device is reprogrammed with the new E-UTRAN RAT being included.

In order to judge whether an old removable memory device or an up-to-date or a reprogrammed removable memory device is in use, the contents of the one or more PLMN/RAT data files 206-208 can be utilized. Namely, if any PLMN/RAT entry in any of PLMN/RAT data files 206-208 includes a RAT (for example and referred to herein as a E-UTRAN RAT, although one of ordinary skill in the art realizes that the embodiments described herein are applicable to any type of "new" RAT) that has been newly detected by the MS, then the priority level of the newly detected RAT shall be determined by reference to the information present in the removable memory device (for example, a USIM). Otherwise, if the newly detected RAT is a "new" RAT, that is, a RAT that is not listed in any entry in any of the PLMN/RAT data files 206-208, the priority level of the new RAT (that is, the E-UTRAN RAT) is determined by RAT preference rule 212 maintained by the MS, in conjunction with the information present in the PLMN/RAT data files 206-208. In other words, RAT preference rule 212 defines a relative priority for the new RAT relative to one or more existing RATs, that is, RATs that are already included in PLMN/RAT data files 206-208. So MS 102 still may access the PLMN/RAT data files 206-208 to determine the RAT Priority of the existing RATs for the PLMN which the MS has found, and then use RAT preference rule 212 to determine the priority of the new RAT relative to the existing RATs.

By employing a relative priority scheme for RAT preference rule 212 rather than an absolute priority scheme, RAT preference rule 212 does not need to solely define an explicit priority level for each and every supported RAT that can be applied to all roaming partners of the HPLMN. For example, suppose that PLMN-A and PLMN-B are both roaming partners of the HPLMN, and in one of the PLMN/RAT data files 206-208, PLMN-A/UTRAN is listed before PLMN-A/GSM, while PLMN-B/GSM is listed before PLMN-B/UTRAN. In such case, RAT preference rule 212 may not define an absolute priority level for UTRAN and GSM to be used for both PLMN-A and PLMN-B, when considering the priority level of the new E-UTRAN RAT. In another embodiment of the present invention, MS 102 may determine whether an old removable memory device or an up-to-date or a reprogrammed removable memory device is in use by checking to see if any SIM elementary files (EFs) which are known to be uniquely associated with the new RAT are or are not present on the removable memory device. For example, for the case of E-UTRAN RAT, EF-EPSLOCI (Elementary File-EPS Location Information, which is defined in 3GPP TS 31.121, Release 9, Section 4.4.2 31.102, Release 9, Section 4.2.91) is a SIM file which is only applicable to E-UTRAN RAT and not normally present on older SIM cards whose data was programmed before E-UTRAN RAT was seriously considered for general usage. If the SIM files known to be uniquely associated with the new RAT are not present, then the MS may assume that an old removable memory device is detected.

Figure 3:
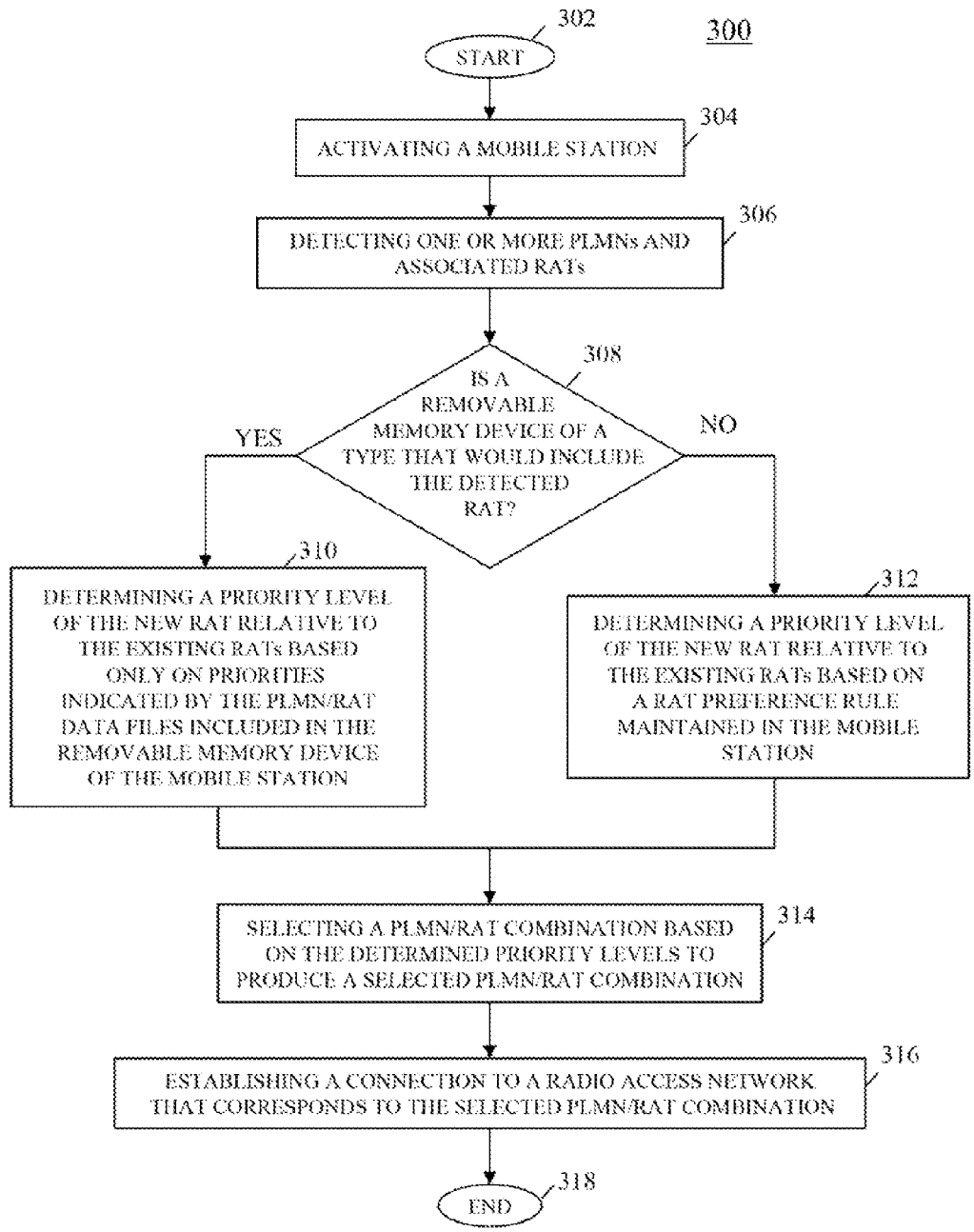
FIG. 3 is a logic flow diagram of a method performed by the mobile station of FIG. 1 in selecting a radio access technology in accordance with various embodiments of the present invention.

Referring now to FIG. 3, a logic flow diagram 300 is provided that illustrates a method by which MS 102 selects a RAT in accordance with an embodiment of the present invention. Logic flow diagram 300 begins (302) when MS 102 activates (304) in communication system 100, for example, by powering up or by moving into the coverage area of communication system 100. In response to activating in communication system 100, MS 102 wirelessly detects (306), via RF transceiver 216, at least one RAT and a PLMN broadcasting on that RAT (a PLMN/RAT combination), that is, detects one or more PLMNs, such as PLMNs 126 and 136, and corresponding access nodes 122 and 132 and RATs $RAT_1$ and $RAT_2$, that provide service to the location where the MS resides. For example, MS 102 may scan for overhead signals that identify the PLMNs and RANs and/or access nodes. If MS 102 is able to detect an overhead signal from a RAN/access node, then the MS further is able to determine the RAT utilized by the RAN/access node as the MS otherwise would be unable to detect the overhead signal broadcast by that RAN/access node utilizing that RAT, and further the MS necessarily must support that RAT or, again, the MS otherwise would be unable to detect the overhead signal broadcast by that RAN/access node.

In addition, MS 102 determines (308) a type of removable memory device 204, and more particularly determines whether the removable memory device 204 is of a type that would include the detected RAT(s), such as an older or outdated type that would not include the detected RAT(s) or a newer or current type that would include the detected RAT(s). For example, MS 102 may read the one or more PLMN/RAT data files 206-208 maintained in removable memory device 204 of the MS and determine whether the one or more PLMN/RAT data files 206-208 maintain information on the detected RAT(s), for example, whether each of the one or more detected PLMNs, that is, PLMNs 126 and 136, and the detected RATs, that is, $RAT_1$ and $RAT_2$, is listed in one of the one or more PLMN/RAT data files. By way of another example, in addition to or instead of determining the presence of information on the detected RAT(s), MS 102 may determine whether one or more elementary files (EFs), which are known to be uniquely associated with the detected RAT(s) and are normally present on the removable memory device if the detected RAT(s) was considered for general usage at the time of programming of the removable memory device, are present on the removable memory device.

MS 102 then determines relative preference or priority levels of the detected PLMN/RAT combinations, that is, PLMN 126/$RAT_1$ and PLMN 136/$RAT_2$.

That is, for each detected PLMN/RAT combination, when MS 102 determines (308) that removable memory device 204 is of a type (for example, a USIM) that would include the detected RAT, for example, determines that the RAT is included in at least one entry in any of the PLMN/RAT data files 206-208 (for example, data files 206-208 contain information that was most likely specified at a time when the detected RAT was seriously considered for general usage), the MS determines (310) a priority level of the detected PLMN/RAT combination relative to other detected PLMN/RAT combinations based only on the PLMN/RAT combination preferences/priorities maintained in the PLMN/RAT data files 206-208. In the event that the detected RAT is included in at least one entry in any of the PLMN/RAT data files 206-208 but the detected PLMN/RAT combination is not explicitly listed in the PLMN/RAT data files 206-208, then the priority level of this PLMN/RAT combination may be determined to be lower than any PLMN/RAT combination listed in the PLMN/RAT data files 206-208. When MS 102 determines (308) that removable memory device 204 is of a type (for example, a SIM) that would not include the detected RAT, for example, determines that the detected first RAT is not included in any entry in any of the PLMN/RAT data files 206-208 (for example, data files 206-208 contain information that was most likely specified at a time before the detected RAT was seriously considered for general usage), then the MS determines (312) a priority level of the detected PLMN/RAT combination relative to other PLMN/RAT combinations included in the one or more PLMN/RAT data files 206-208 based on the RAT preference rule 212 maintained by the MS in conjunction with the PLMN/RAT data files 206-208 stored in removable memory device 204.

For example, suppose that both detected PLMN/RAT combinations, that is, a first detected PLMN/RAT combination, for example, PLMN 136/$RAT_1$, and a second detected PLMN/RAT combination, for example, PLMN 126/$RAT_2$, are included in one or more of PLMN/RAT data files 206-208. Then MS 102 determines a priority level of the detected PLMN/RAT combinations based only on the PLMN/RAT combination preferences/priorities maintained in the PLMN/RAT data files 206-208.

By way of another example, suppose that a first detected RAT, that is, $RAT_1$, is not listed in any entry in any of the PLMN/RAT data files 206-208 (for example, that data files 206-208 contain information that was most likely specified at a time before the detected $RAT_1$ was seriously considered for general usage). In one such example, suppose there is another entry in the PLMN/RAT data files 206-208 which lists PLMN136 with another, second RAT (which second RAT may or may not have been detected), for example, "PLMN 136/$RAT_2$," and the RAT preference rule 212 maintained by the MS indicates that $RAT_1$ is a higher priority than $RAT_2$. In such an instance, MS 102 may operate as if another entry having "PLMN 136/$RAT_1$" was located in the preferred list data files at a position, or priority, which is just above the position/priority associated with the entry for "PLMN 136/$RAT_2$." In another such example, suppose with respect to first detected PLMN/RAT combination PLMN 136/$RAT_1$, there is an entry in the PLMN/RAT data files 206-208 which lists PLMN 136 with the second RAT, that is, "PLMN136/$RAT_2$," and the RAT preference rule 212 maintained by the MS indicates that $RAT_1$ has a same priority as $RAT_2$. In such an instance, MS 102 may operate as if the entry having "PLMN 136/$RAT_2$" were programmed with "PLMN 136/$RAT_1$+$RAT_2$" instead. In yet another such example, suppose there is another entry in the PLMN/RAT data files 206-208 which lists PLMN 136 with the second RAT, for example, "PLMN 136/$RAT_2$," and the RAT preference rule 212 maintained by the MS indicates that $RAT_1$ is a lower priority than $RAT_2$. In such an instance, MS 102 may operate as if another entry having "PLMN 136/$RAT_1$" were located in the preferred list data files at a position, or priority, which is just below the position/priority associated with the entry for "PLMN 136/$RAT_2$." In still another such example, suppose there is no other entry in the PLMN/RAT data files 206-208 which lists PLMN 136 with any other RAT. In such an instance, MS 102 may consider PLMN 136, for any RAT supported by the MS, to be lower in priority than all of the other PLMN/RAT combinations listed in the PLMN/RAT data files 206-208.

For example and merely for the purpose of illustrating the principles of the present invention, suppose that $RAT_1$ is E-UTRA and $RAT_2$ is UTRA or GSM, some examples of what RAT preference rule 212 might specify are:

E-UTRA has higher priority than both UTRA and GSM,
E-UTRA has lower priority than GSM,
E-UTRA has the same priority as GSM,
E-UTRA has higher priority than GSM,
E-UTRA has lower priority than UTRA,
E-UTRA has the same priority as UTRA, and
E-UTRA has higher priority than UTRA.

In such an event, the priority of PLMN 136/$RAT_2$ relative to PLMN 126/$RAT_1$ may be determined with reference to RAT preference rule 212.

In response to determining the relative priority levels of the detected PLMN/RAT combinations, MS 102 selects (314) a PLMN/RAT combination for a radio communication, for example, the highest priority or most preferred PLMN/RAT combination, and establishes (316) a wireless connection, utilizing the selected RAT, with the RAN associated with the selected PLMN/RAT combination. Logic flow 300 then ends (318).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, in a mobile station, for selecting a public land mobile network (PLMN) and radio access technology (RAT), the method comprising:
    maintaining, in a removable memory device, a data file comprising a prioritized listing of one or more public land mobile networks (PLMNs) in combination with one or more radio access technologies (RATs);
    wirelessly detecting a RAT and a PLMN broadcasting on that RAT to produce a detected PLMN and RAT combination;
    determining a type of the removable memory device;
    in response to determining that the removable memory device is a type that would maintain information on the detected RAT, determining a priority of the detected PLMN and RAT combination relative to one or more other PLMN and RAT combinations based solely on the prioritizations included in the data file in the removable memory device;
    in response to determining that the removable memory device is a type that would not maintain information on the detected RAT, determining a priority of the detected PLMN and RAT relative to one or more other PLMN and RAT combinations based on a RAT preference rule separate from, and in conjunction with, the listing of PLMN and RAT combinations in the data file in the removable memory device; and
    selecting a PLMN and RAT for radio communications based on the determined priority of all the found PLMNs and RATs.

2. The method of claim 1, wherein determining a type of the removable memory device comprises one or more of:
    determining that a detected radio access technologies (RATs) is not listed in any entry in one or more of the data files containing the prioritized listing of public land mobile networks (PLMNs) and RATs; and
    determining that one or more elementary files, which are known to be uniquely associated with the detected RAT, are not present on the removable memory device.

3. The method of claim 1, wherein the radio access technology (RAT) preference rule is a relative rule which specifies the priority of a particular newer RAT relative to one or more older RATs.

4. The method of claim 1, wherein wirelessly detecting a public land mobile networks (PLMN) and radio access technology (RAT) combination comprises wirelessly detecting a plurality of PLMN and RAT combinations, wherein determining a type of the removable memory device comprises determining that the removable memory device is a type that would not maintain information on the detected RAT of a first PLMN and RAT combination of the plurality of PLMN and RAT combinations, and wherein the method further comprises:
    determining a priority of the first detected PLMN and RAT combination relative to one or more other detected PLMN and RAT combinations by determining whether the data file comprises one or more PLMN and RAT combinations that include the PLMN of the first PLMN and RAT combination in combination with a RAT other than the first RAT;
    when the data file comprises one or more PLMN and RAT combinations that include the PLMN of the first PLMN and RAT combination in combination with a second RAT different from the first RAT, one or more of:
        if the first RAT is higher in priority than the second RAT according to the RAT preference rule, then operate as if another entry containing the first PLMN and RAT combination was included in the data file of PLMN and RAT combinations at an immediate higher priority than the combination of the PLMN of the first PLMN and RAT and the second RAT;
        if the first RAT has the same priority as the second RAT according to the RAT preference rule, then operate as if the entry in the data file containing the combination of the PLMN of the first PLMN and RAT and the second RAT includes the combination of the PLMN of the first PLMN and RAT and both the second RAT and the first RAT;
        if the first RAT is lower in priority than the second RAT according to the RAT preference rule, then operate as if another entry containing the first PLMN and RAT combination was included in the data file of PLMN and RAT combinations at an immediate lower priority than the combination of the PLMN of the first PLMN and RAT and the second RAT.

5. The method of claim 1, wherein wirelessly detecting a public land mobile networks (PLMN) and radio access technology (RAT) combination comprises wirelessly detecting a plurality of PLMN and RAT combinations, wherein determining a type of the removable memory device comprises determining that the removable memory device is a type that would not maintain information on the detected RAT of a first PLMN and RAT combination of the plurality of PLMN and RAT combinations, and wherein the method further comprises:
    determining a priority of the first detected PLMN and RAT combination relative to one or more other detected PLMN and RAT combinations by determining whether the data file comprises one or more PLMN and RAT combinations that include the PLMN of the first PLMN and RAT combination in combination with a RAT other than the first RAT; and
    when the data file does not include one or more PLMN and RAT combinations that include the PLMN of the first PLMN and RAT combination in combination with a second RAT different from the first RAT, determining that the first PLMN and RAT combination is of lower priority than any PLMN and RAT combination contained in the data file of PLMN and RAT combinations.

6. The method of claim 1, wherein the data file comprises one or more of a User Controlled PLMN Selector with Access Technology (EF-PLMNwAcT) data file and an Operator Controlled PLMN Selector with Access Technology (EF-OPLMNwAcT) data file.

7. The method of claim 1, wherein the removable memory device comprises one of a Subscriber Identity Module (SIM) card and a universal Subscriber Identity Module (USIM) card.

8. The method of claim 1, further comprising establishing a wireless connection to a radio access network utilizing the selected radio access technology.

9. The method of claim 1, further comprising maintaining the radio access technology preference rule in a non-removable memory device of the mobile station.

10. The method of claim 1, wherein the RAT preference rule comprises one of:
Evolved UMTS Terrestrial Radio Access (E-UTRA) has higher priority than both UMTS Terrestrial Radio Access (UTRA) and Global System for Mobile communications (GSM),
E-UTRA has lower priority than GSM,
E-UTRA has the same priority as GSM,
E-UTRA has higher priority than GSM,
E-UTRA has lower priority than UTRA,
E-UTRA has the same priority as UTRA, and
E-UTRA has higher priority than UTRA.

11. A mobile station comprising:
a transceiver that is configured to wirelessly detecting a radio access technology (RAT) and a public land mobile network (PLMN) broadcasting on that RAT to produce a detected PLMN and RAT combination;
one or more memory devices, wherein the one or more memory devices comprise a removable memory device that is configured to maintain a data file that includes a prioritized listing of one or more PLMN and RAT combinations and wherein the one or more memory devices further maintain a radio access technology (RAT) preference rule; and
a processor that is configured to:
determine a type of the removable memory device;
in response to determining that the removable memory device is a type that would maintain information on the detected RAT, determine a priority of the detected PLMN and RAT combination relative to one or more other PLMN and RAT combinations based solely on the prioritizations included in the data file in the removable memory device;
in response to determining that the removable memory device is a type that would not maintain information on the detected RAT, determine a priority of the detected PLMN and RAT relative to one or more other PLMN and RAT combinations based on a RAT preference rule separate from, and in conjunction with, the listing of PLMN and RAT combinations in the data file in the removable memory device; and
select a PLMN and RAT for radio communications based on the determined priority of all the found PLMNs and RATs.

12. The mobile station of claim 11, wherein the processor is configured to determine a type of the removable memory device by one or more of:
determining that a detected radio access technologies (RATs) is not listed in any entry in one or more of the data files containing the prioritized listing of public land mobile networks (PLMNs) and RATs; and
determining that one or more elementary files, which are known to be uniquely associated with the detected RAT, are not present on the removable memory device.

13. The mobile station of claim 11, wherein the radio access technology (RAT) preference rule is a relative rule which specifies the priority of a particular newer RAT relative to one or more older RATs.

14. The mobile station of claim 11, wherein the processor is configured to wirelessly detecting a public land mobile networks (PLMN) and radio access technology (RAT) combination by wirelessly detecting a plurality of PLMN and RAT combinations, wherein the processor is configured to determine a type of the removable memory device by determining that the removable memory device is a type that would not maintain information on the detected RAT of a first PLMN and RAT combination of the plurality of PLMN and RAT combinations, and wherein the processor further is configured to:
determine a priority of the first detected PLMN and RAT combination relative to one or more other detected PLMN and RAT combinations by determining whether the data file comprises one or more PLMN and RAT combinations that include the PLMN of the first PLMN and RAT combination in combination with a RAT other than the first RAT;
when the data file comprises one or more PLMN and RAT combinations that include the PLMN of the first PLMN and RAT combination in combination with a second RAT different from the first RAT, one or more of:
if the first RAT is higher in priority than the second RAT according to the RAT preference rule, then operate as if another entry containing the first PLMN and RAT combination was included in the data file of PLMN and RAT combinations at an immediate higher priority than the combination of the PLMN of the first PLMN and RAT and the second RAT;
if the first RAT has the same priority as the second RAT according to the RAT preference rule, then operate as if the entry in the data file containing the combination of the PLMN of the first PLMN and RAT and the second RAT includes the combination of the PLMN of the first PLMN and RAT and both the second RAT and the first RAT;
if the first RAT is lower in priority than the second RAT according to the RAT preference rule, then operate as if another entry containing the first PLMN and RAT combination was included in the data file of PLMN and RAT combinations at an immediate lower priority than the combination of the PLMN of the first PLMN and RAT and the second RAT.

15. The mobile station of claim 11, wherein the processor is configured to wirelessly detect a public land mobile networks (PLMN) and radio access technology (RAT) combination by wirelessly detecting a plurality of PLMN and RAT combinations, wherein the processor is configured to determine a type of the removable memory device by determining that the removable memory device is a type that would not maintain information on the detected RAT of a first PLMN and RAT combination of the plurality of PLMN and RAT combinations, and wherein the processor further is configured to:
determine a priority of the first detected PLMN and RAT combination relative to one or more other detected PLMN and RAT combinations by determining whether the data file comprises one or more PLMN and RAT combinations that include the PLMN of the first PLMN and RAT combination in combination with a RAT other than the first RAT; and
when the data file does not include one or more PLMN and RAT combinations that include the PLMN of the first PLMN and RAT combination in combination with a second RAT different from the first RAT, determine that the first PLMN and RAT combination is of lower priority than any PLMN and RAT combination contained in the data file of PLMN and RAT combinations.

16. The mobile station of claim 11, wherein the data file comprises one or more of a User Controlled PLMN Selector with Access Technology (EF-PLMNwAcT) data file and an Operator Controlled PLMN Selector with Access Technology (EF-OPLMNwAcT) data file.

17. The mobile station of claim 11, wherein the removable memory device comprises one of a Subscriber Identity Module (SIM) card and a universal Subscriber Identity Module (USIM) card.

18. The mobile station of claim 11, wherein the processor further is configured to establish a wireless connection to a radio access network utilizing the selected radio access technology.

19. The mobile station of claim 11, further comprising a non-removable memory device that maintains the radio access technology preference rule.

20. The mobile station of claim 11, wherein the RAT preference rule comprises one of:
   Evolved UMTS Terrestrial Radio Access (E-UTRA) has higher priority than both UMTS Terrestrial Radio Access (UTRA) and Global System for Mobile communications (GSM),
   E-UTRA has lower priority than GSM,
   E-UTRA has the same priority as GSM,
   E-UTRA has higher priority than GSM,
   E-UTRA has lower priority than UTRA,
   E-UTRA has the same priority as UTRA, and
   E-UTRA has higher priority than UTRA.

* * * * *